United States Patent
Yamamoto et al.

(10) Patent No.: US 7,029,641 B2
(45) Date of Patent: Apr. 18, 2006

(54) METHOD OF MAKING LITHIUM BOROHYDRIDE

(75) Inventors: John Hiroshi Yamamoto, Haverhill, MA (US); Won Suh Park, North Andover, MA (US); Aaron Sarafinas, Ivyland, PA (US); Michael Miller Cook, Boxford, MA (US); Stephen Gerard Maroldo, Ambler, PA (US)

(73) Assignee: Rohm and Haas Company, Philadelphia, PA (US)

(*) Notice: Subject to any disclaimer, the term of this patent is extended or adjusted under 35 U.S.C. 154(b) by 260 days.

(21) Appl. No.: 10/263,629

(22) Filed: Oct. 3, 2002

(65) Prior Publication Data
US 2003/0068265 A1 Apr. 10, 2003

Related U.S. Application Data

(60) Provisional application No. 60/328,317, filed on Oct. 10, 2001.

(51) Int. Cl.
*C01B 35/00* (2006.01)

(52) U.S. Cl. .................................... 423/287

(58) Field of Classification Search ............... 423/287
See application file for complete search history.

(56) References Cited

U.S. PATENT DOCUMENTS

| 2,726,926 | A | * | 12/1955 | Paul et al. ................. 423/287 |
| 2,829,946 | A | * | 4/1958 | Cunningham et al. ...... 423/287 |
| 3,113,832 | A | * | 12/1963 | Kollonitsch et al. ........ 423/287 |
| 3,151,930 | A | * | 10/1964 | Bragdon et al. ............ 423/287 |
| 3,215,491 | A | * | 11/1965 | Schubert et al. ............ 423/287 |
| 3,222,120 | A | * | 12/1965 | Del Giudice ............... 423/287 |
| 3,423,192 | A | | 1/1969 | Snover |
| 3,460,919 | A | * | 8/1969 | Beumel, Jr. et al. ........ 423/287 |
| 3,473,899 | A | * | 10/1969 | Cooper ....................... 423/287 |
| 3,515,522 | A | * | 6/1970 | Vaclav et al. ............... 423/287 |
| 4,002,726 | A | | 1/1977 | Filby |
| 6,022,513 | A | * | 2/2000 | Pecoraro et al. ............ 423/311 |
| 6,063,929 | A | | 5/2000 | Kas et al. |
| 6,524,542 | B1 | * | 2/2003 | Amendola et al. .......... 423/286 |

FOREIGN PATENT DOCUMENTS

| EP | 0072897 | * | 6/1982 | |
| EP | 0072897 | A1 | 6/1982 | |
| GB | 1104200 | | 9/1966 | |
| JP | 4-224585 | * | 8/1992 | ................. 423/287 |

OTHER PUBLICATIONS

Herbert C. Brown et al., Inorganic Chemistry, vol. 21, pp. 3357-3361, 1982, no month.
Herbert C. Brown et al., Inorganic Chemistry, vol. 20, pp. 4454-4457, 1981, no month.

* cited by examiner

*Primary Examiner*—Wayne A. Langel
(74) *Attorney, Agent, or Firm*—Carl P. Hemenway

(57) ABSTRACT

The present invention relates to a method of making lithium borohydride that gives high yields while maintaining ease of purification.

7 Claims, No Drawings

METHOD OF MAKING LITHIUM BOROHYDRIDE

CROSS REFERENCE TO RELATED PATENT APPLICATIONS

This is a non-provisional application of prior pending U.S. provisional application Ser. No. 60/328,317 filed Oct. 10, 2001.

BACKGROUND

This invention relates to method of making lithium borohydride that gives high yield and allows easier purification than previous methods.

Another method of making lithium borohydride, as disclosed by H. C. Brown, et. al. in Inorganic Chemistry, vol. 21, pp. 3657–3661, 1982 (herein called "Brown, et. al."), involves reacting sodium borohydride with lithium chloride in the presence of a solvent, with glass beads of 6 millimeter diameter present in the reaction container. Brown et. al. teach that, to produce a batch of lithium borohydride larger than 2.2 grams, the use of glass beads or other small solid inert objects called "attrition media" is necessary to achieve yields that are large enough to be useful.

Attrition media are known in the chemical arts and are described, for example, in Perry's Chemical Engineer's Handbook, 7th edition, 1997, "Crushing and Grinding Equipment" (herein called "Perry"). As taught by Perry, attrition media are chosen to be inert to the chemical process in which they are used; some typical materials are sand, glass, and steel. Perry further teaches that attrition media are typically spherical, cylindrical, or irregular in shape, and they typically range in size from 0.2 to 15 millimeters. According to the teaching of Perry, attrition media are often used for the purpose of breaking down the particles of some powdered material; in such cases, the size of the attrition media is typically chosen to be 10 to 100 times larger than the particles of the powdered material.

In the production of lithium borohydride, the presence of glass beads or other similar attrition media in the reaction container would create severe complications in the manufacturing process. The beads take up volume in the reaction container, reducing the productivity of the reactor. The beads add difficulty to removing the lithium borohydride from the reaction vessel, and they add difficulty to isolating the byproducts for disposal. The problem addressed by this invention is the provision of a method of making lithium borohydride in high yield, in a good solvent, without the need for glass beads or other attrition media.

STATEMENT OF THE INVENTION

In a first aspect of the present invention, there is provided a method for preparing lithium borohydride comprising
(a) placing in a container a first reactant comprising one or more members of the list consisting of sodium borohydride and potassium borohydride, a second reactant comprising lithium chloride, and a solvent capable of dissolving lithium borohydride; and
(b) mixing the contents of said container, wherein said mixing imparts power per unit volume of at least 500 watt/cubic meter to the contents of said container;

wherein said method is performed without the use of attrition media.

In a second aspect of the present invention, there is provided a composition comprising a mixture comprising
(i) a solution of lithium borohydride dissolved in a solvent capable of dissolving at least 10 gram of lithium borohydride per 1000 gram of solvent, and
(ii) solid sodium chloride, solid potassium chloride, or a mixture thereof;

wherein attrition media are not present in said composition, and wherein said composition is produced by a method comprising
(a) placing in a container a first reactant comprising one or more members of the list consisting of sodium borohydride and potassium borohydride, a second reactant comprising lithium chloride, and a solvent capable of dissolving lithium borohydride; and
(b) mixing the contents of said container, wherein said mixing imparts power per unit volume of at least 500 watt/cubic meter to the contents of said container;

wherein said method is performed without the use of attrition media.

DETAILED DESCRIPTION OF THE INVENTION

The chemical reactions that produce lithium borohydride have been disclosed previously, as in for example Brown et. al. Solid sodium borohydride or potassium borohydride is reacted with lithium chloride in the presence of a solvent. The chemical reaction is $$MBH_4 + LiCl \rightarrow LiBH_4 + MCl$$

where "M" represents sodium, potassium, or a mixture thereof.

In the practice of the present invention, the solvent is any effective solvent for dissolving lithium borohydride. An effective solvent is one in which at least 10 gram of lithium borohydride will dissolve per 1000 gram of solvent and which does not react with lithium borohydride. Preferably, the solvent should be a polar, aprotic solvent. More preferably, the solvent should be one chosen from the list consisting of isopropylamine, 1,3-dioxane, monoglyme, tetrahydrofuran, and diethyl ether. The most preferred solvent is tetrahydrofuran. Preferably, the solvent should is substantially anhydrous, that is, substantially free of water, because water is known to react with lithium borohydride. Preferably, the weight of the water content of the solvent is below 0.05% based on the total weight of the solvent, more preferably below 0.02%, even more preferably below 0.01%, and most preferably below 0.005%.

The reaction container may be any vessel suitable for performing chemical reactions. The container must be capable of causing mixing of the reaction mixture. Preferably, the mixing will be performed continuously throughout the time the reaction is occurring. Preferably, the container should also have apparatus for maintaining the reaction at a fixed temperature. Most preferably, the container should have both the temperature regulating apparatus and apparatus for conducting the reaction under condition of reflux. By "reflux" we mean provision of means to heat the reaction mixture to its boiling point, to trap the solvent vapors, to bring the vapors into contact with a surface that is cooler that the reaction mixture so that the solvent vapors condense, and to return the condensed liquid solvent back to the reaction mixture.

The mixing of the reaction mixture may be by any means known in the chemical art. Some suitable mixing means are, for example, rotating devices, radial agitators, and axial agitators. Other suitable means of providing mixing include, for example, inducing bubbles in the mixture by cavitation, ultrasonic waves, or boiling. Preferred are rotating devices. More preferred is a shaft rotating on its own axis with one or more structures such as blades or impellers attached to the shaft and oriented perpendicular to the axis.

In the practice of this invention, the agitation is intense. The intensity of the agitation can be measured and described by the power per unit volume of the mixing process, as known in the chemical engineering art and described, for example, in Fluid Mixing Technology by James Y. Oldshue, published by McGraw-Hill in 1983 (herein called "Oldshue"). Mixing that provides power per unit volume of 500 watts per cubic meter or greater is preferred. More preferred is power per unit volume of 1,500 watts per cubic meter or greater, and even more preferred is power per unit volume of 2,000 watts per cubic meter or greater.

Generally, the maximum power per unit volume that can be used is determined by the onset of surface aeration, which depends on the type of reaction container and the mixing method chosen by the practitioner. It is believed that, once surface aeration is present, delivering more power to the mixing means does not result in any enhancement to the efficiency of the reaction. The most preferred power per unit volume is the highest that the chosen mixing method can reasonably produce without causing surface aeration.

The means for mixing must be chosen by the practitioner, because the preferred means will depend on various specific factors, such as for example the size and shape of the vessel containing the reaction. In a round-bottom flask with capacity of 1000 ml, the preferred mixing method is a rotating impeller driven by an electric motor. In such a vessel, the preferred impeller shape is a flat piece of non-reactive material in a shape called "half-moon," wherein one edge is straight and the other is curved to approximate the curvature of the bottom of the flask. In other vessels, the mixing means must be chosen by the practitioner as preferred for that vessel. Industrial scale chemical reactions are often performed in cylindrical tanks with dished or flat bottoms. In such vessels, mixing may be performed by any of a variety of means known in the art, including for example rotating impellers, homogenizers, rotor-stator devices, and combinations thereof. If rotating impellers are chosen, suitable impellers include, for example, open impellers and close clearance impellers. If open impellers are chosen, suitable impellers include, for example, radial flow impellers, axial flow impellers, and multiples and combinations thereof. If close clearance impellers are chosen, suitable impellers include, for example, gate impellers, helical impellers, anchor impellers, and multiples and combinations thereof. In other cases, industrial scale chemical reactions are performed in pipelines. In pipelines, various suitable mixing means are known in the art and include for example inline mixers and motionless mixers.

Once the practitioner has chosen a container and a means of mixing, the power per unit volume can be determined, using the methods of Oldshue. For example, if the means of mixing is a rotating impeller, the practitioner can determine how the power per unit volume depends on the rotation speed of the impeller, the viscosity of the reaction mixture, and the volume of the reaction mixture. Then, as changes occur in the speed, viscosity, or volume, the practitioner will be able to calculate the changes in power per unit volume.

In the practice of this invention, the temperature of the reaction is not critical, as long as the temperature is kept below 200° C. Temperatures above 25° C. are preferred. More preferred is 40° C., unless that is above the boiling point of the solvent. Especially preferred is the boiling point of the solvent. When the invention is practiced at the boiling point of the solvent, the apparatus would preferably be equipped with the reflux capability, so the reaction would be performed with the solvent continually undergoing reflux.

In the practice of this invention, the ratio of moles of $MBH_4$ to LiCl should be in the range from 0.70:1.00 to 1.25:1.00. Preferably, the ratio should be in the range from 0.90:1.00 to 1.10:1.00, and most preferably in the range from 0.98:1.00 to 1.02:1.00.

The extent of reaction is determined by the "Hydrogen Evolution Technique," in which a sample of $LiBH_4$ solution is treated with water and acid in a hydrogen evolution apparatus. The evolved hydrogen displaces water into a 2000 milliliter beaker. From the weight of water displaced, the percent $LiBH_4$ is calculated. This method is described in detail in "Assay of Venpure™ LBH Solutions by the Hydrogen Evolution Technique," test method M&S #080, published by the Rohm and Haas Company, Philadelphia, Pa.

The practitioner of this invention may choose to use the measurement of the extent of the reaction to determine the time duration of the reaction. That is, the practitioner may decide on a desired target extent of reaction and then allow the reaction to proceed for the time necessary to reach that extent, as measured by the Hydrogen Evolution Technique." Typically, reactions are allowed to proceed for durations of 0.5 to 24 hours. More common are durations of between 5 and 18 hours.

EXAMPLES

Example 1

The apparatus used was a 1000-ml 3-neck round-bottom flask, equipped with a half moon impeller, 7.62 centimeters long. As described above, the methods of Oldshue were used to determine the power per unit volume. The flask was dried in an oven, cooled under a stream of nitrogen gas, and then equipped with a thermometer, condenser, and overhead stirrer. Into the flask was placed 500 ml of anhydrous tetrahydrofuran (THF), 54 grams potassium borohydride, and 42 grams of lithium chloride. The reaction mixture was kept under nitrogen gas. The impeller was rotated at 699 revolutions per minute (rpm), which imparted power per unit volume of 2,708 watt/cubic meter. The reaction mixture was held under reflux at 67° C. for 10 hours.

The THF solution was filtered. The remaining white powder was washed with THF, which was combined with the filtered THF. This combined THF solution was concentrated by evaporation until 79 ml of solution remained, and the solution was filtered again.

The solution was analyzed by the hydrogen evolution method, and the yield of $LiBH_4$ was 90%.

Comparative A

Lithium Borohydride was prepared using the quantities and conditions of Example 1, except that the rotation speed of the stirrer was 200 rpm, imparting power per unit volume of 65 watt/cubic meter. The yield was 73%, much lower than the yield of Example 1 and too low to be useful in a process for the commercial manufacture of lithium borohydride.

Comparative B

Lithium Borohydride was prepared using the quantities and conditions of Example 1, except that the rotation speed of the stirrer was somewhat higher than that of Comparative A but still lower than Example 1. The impeller rotation speed for Comparative B was 300 rpm, imparting power per unit volume of 215 watt/cubic meter. The yield was 75%, slightly higher than the yield of Comparative A but still much lower than the yield of Example 1.

We claim:

1. A method for preparing lithium borohydride on an industrial scale comprising
   (a) placing in a cylindrical tank 1 mole or more of a first reactant comprising one or more members of the list consisting of sodium borohydride and potassium borohydride, 1 mole or more of a second reactant comprising lithium chloride, and a solvent capable of dissolving lithium borohydride; and
   (b) mixing the contents of said cylindrical tank, wherein said mixing is performed by rotating a shaft connected to one or more blades or impellers, and wherein said mixing imparts power per unit volume of at least 500 watt/cubic meter to said contents of said cylindrical tank;
wherein said method is performed without the use of attrition media.

2. The method of claim 1 wherein said first reactant is potassium borohydride.

3. The method of claim 1 wherein said solvent is tetrahydrofuran.

4. The method of claim 1 wherein the temperature of said cylindrical tank is regulated at the reflux temperature of said solvent.

5. The method of claim 1 wherein the molar ratio of said first reactant to said lithium chloride is between 0.98:1.0 and 1.02:1.

6. The method of claim 1 wherein said power per unit volume is at least 1,500 watt/cubic meter.

7. The method of claim 1 wherein said first reactant is potassium borohyciride, said solvent is tetrahydrofuran, the temperature of said cylindrical tank is regulated at the reflux temperature of tetrahydrofuran, the molar ratio of said first reactant to said lithium chloride is between 0.95:1.0 and 1.05:1, and said mixing imparts power per unit volume of at least 1,500 watt/cubic meter.

* * * * *